US008010957B2

(12) United States Patent
O'Brien et al.

(10) Patent No.: US 8,010,957 B2
(45) Date of Patent: Aug. 30, 2011

(54) COMPILER FOR ELIMINATING REDUNDANT READ-MODIFY-WRITE CODE SEQUENCES IN NON-VECTORIZABLE CODE

(75) Inventors: John Kevin Patrick O'Brien, South Salem, NY (US); Kathryn M. O'Brien, South Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 1402 days.

(21) Appl. No.: 11/461,571

(22) Filed: Aug. 1, 2006

(65) Prior Publication Data

US 2008/0052688 A1 Feb. 28, 2008

(51) Int. Cl.
G06F 9/45 (2006.01)
(52) U.S. Cl. ...................................................... 717/160
(58) Field of Classification Search .................. 711/100, 711/201; 703/209; 712/6, 22; 345/505; 717/150–151, 156, 160
See application file for complete search history.

(56) References Cited

U.S. PATENT DOCUMENTS

| 5,577,253 | A  | * | 11/1996 | Blickstein ..................... 717/156 |
| 7,219,212 | B1 | * | 5/2007  | Sanghavi et al. ................. 712/6 |
| 2004/0006667 | A1 | * | 1/2004 | Bik et al. ...................... 711/100 |
| 2004/0098556 | A1 | * | 5/2004 | Buxton et al. ................ 711/201 |
| 2005/0097301 | A1 | * | 5/2005 | Ben-David et al. ............ 712/22 |

* cited by examiner

Primary Examiner — Tuan Anh Vu
(74) Attorney, Agent, or Firm — Yee & Associates, P.C.; Matthew B. Talpis

(57) ABSTRACT

A computer implemented method, apparatus, and computer usable program code for eliminating redundant read-modify-write code sequences in non-vectorizable code. Code is received comprising a sequence of operations. The sequence of operations includes a loop. Non-vectorizable operations are identified within the loop that modifies at least one sub-part of a storage location. The non-vectorizable operations are modified to include a single store operation for the number of sub-parts of the storage location.

14 Claims, 10 Drawing Sheets

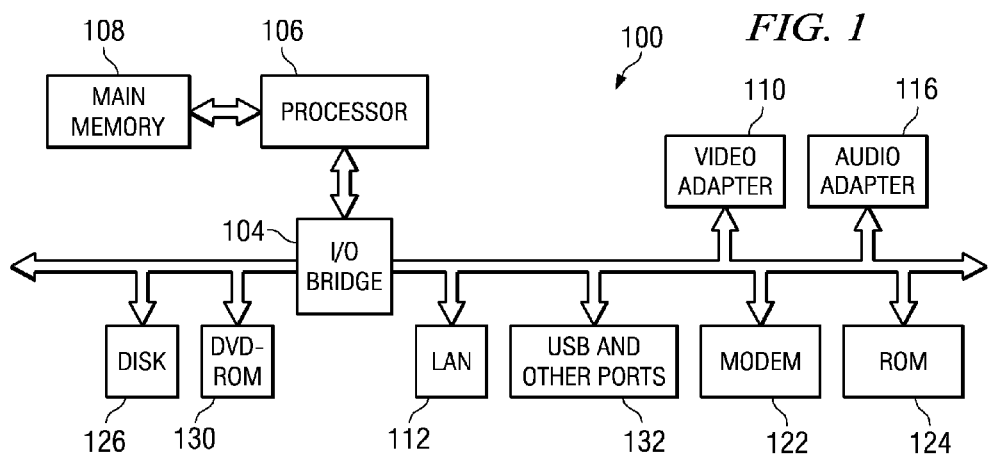
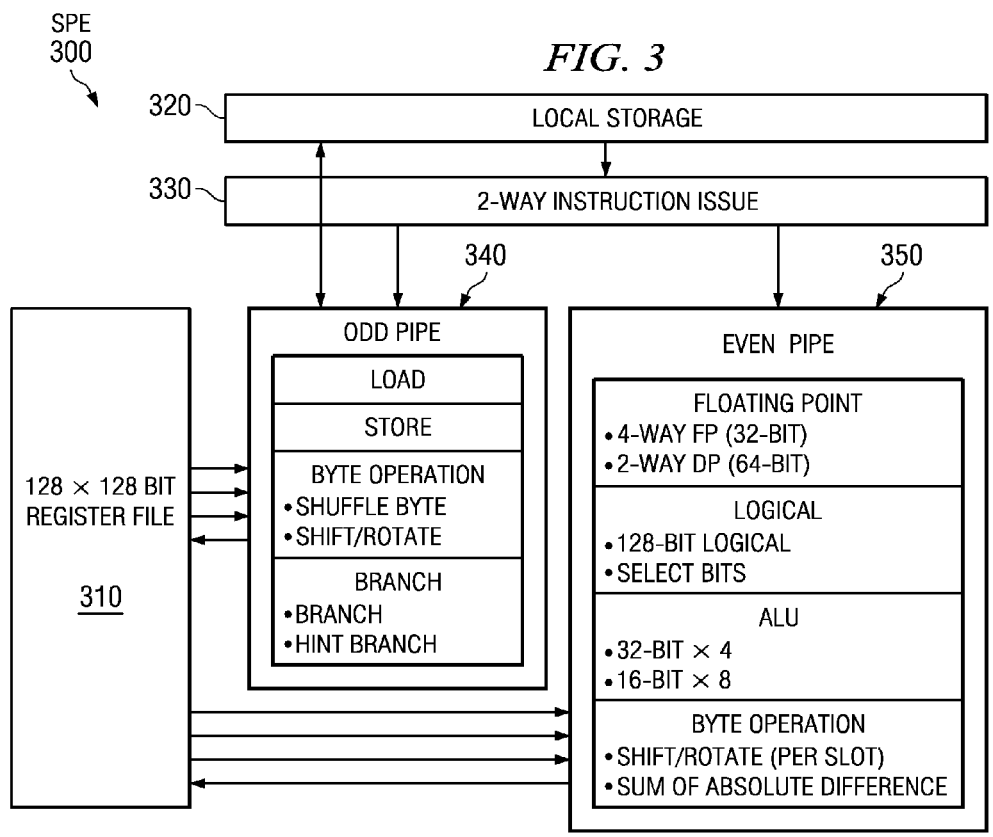

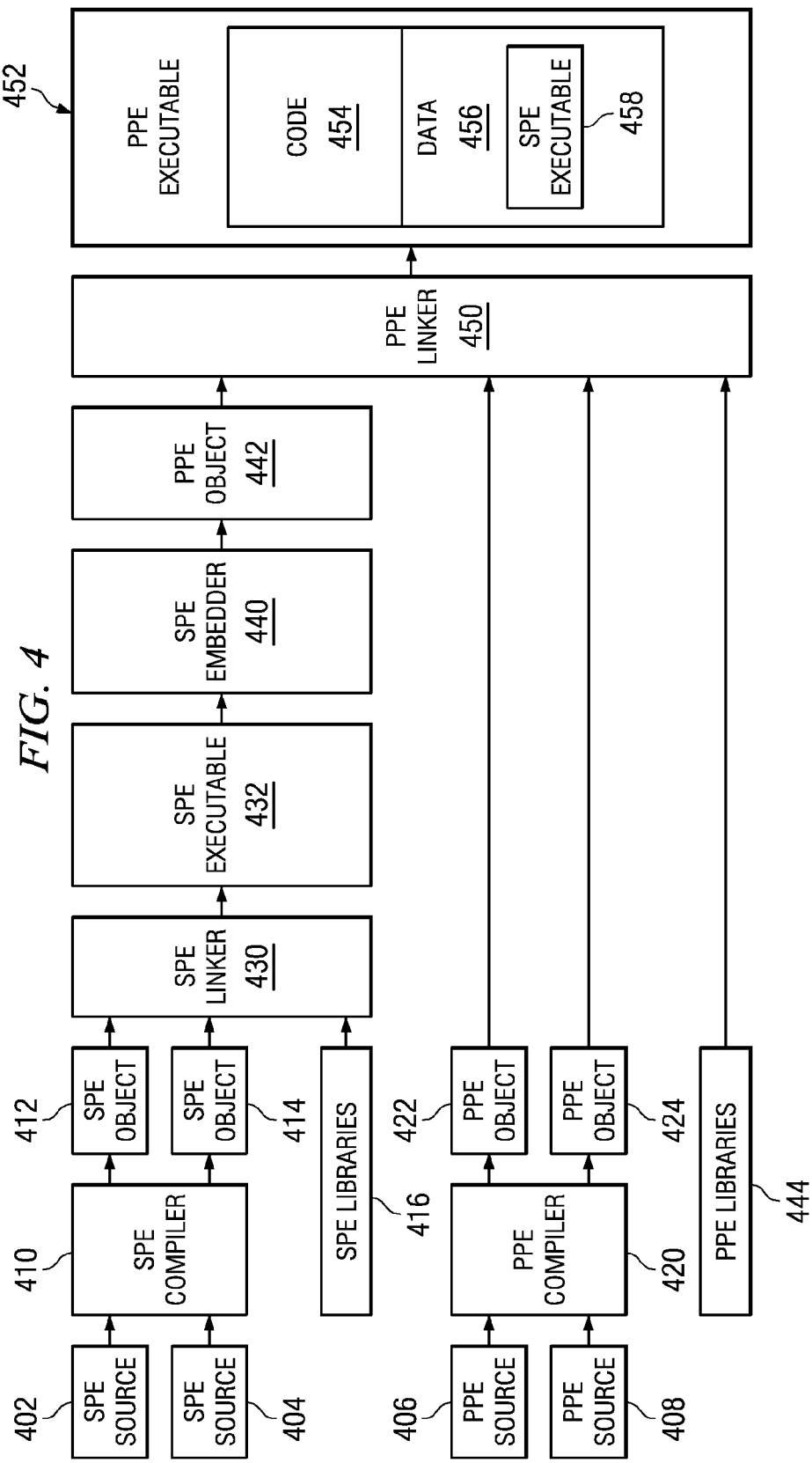

```
struct {int a; int b; int c; int d;} r[256], s[256], t[256]
float x [256], y [256], z[256]

foo() {
        int I;

for (i = 0; i<256;i++) {
            x [i] = y[r[i] .a]+z[s[i] .c];    ← NON-SIMDIZABLE BECAUSE OF
        }                                        IRREGULAR SUBSCRIPTS
} bar () {
        int I;

for (i = 0; i <256; i++) {
            r[i] .a=s[i] .a+t[i]  .a;
            r[i] .b=s[i] .b-t[i]  .b;         ← NON-SIMDIZABLE BECAUSE OF
            r[i] .c=s[i] .c*t[i]  .c;            NON-CONGRUENT COMPUTATION
            r[i] .d=s[i] .d/t[i]  .d;
        }
}
```

| | | | |
|---|---|---|---|
| 15: | CL.3: | | |
| 16: | VLQ | vr592=s.a(vr525, vr563, 0) | |
| 16: | VQBR | vr593=vr593, vr563 | |
| 16: | LR | *vr573=vr593 | |
| 16: | LR | *vr536=vr573 | |
| 16: | VLQ | vr594=t.a(vr537, vr563, 0) | |
| 16: | VQBR | vr595=vr594, vr563 | ORIGINAL "r" IN MEMORY |
| 16: | LR | *vr572=vr595 | |
| 16: | LR | *vr538=vr572 | |
| 16: | A | vr539=vr536, vr538 | |
| 16: | VLQ | vr596=r.a(vr518, vr563, 0) | |
| 16: | CWD | vr597=vr518, vr563 | 702 |
| 16: | VSHUFB | vr598=vr539, vr596, vr597 | |
| 16: | VSTQ | r.a(vr518, vr563, 0)=vr598 | 704 |
| 17: | VLQ | vr599=s.b(vr562, vr563, 0) | |
| 17: | A | vr600=vr562, vr563 | |
| 17: | VQBR | vr601=vr599, vr600 | |
| 17: | LR | *vr571=vr601 | FIRST PORTION MODIFIED |
| 17: | LR | *vr540=vr571 | |
| 17: | VLQ | vr602=t.b(vr560, vr563, 0) | |
| 17: | A | vr603=vr560, vr563 | |
| 17: | VQBR | vr604=vr602, vr603 | |
| 17: | LR | *vr570=vr604 | |
| 17: | LR | *vr541=vr570 | |
| 17: | S | vr542=vr540,vr541 | |
| 17: | VLQ | vr605=r.b(vr558, vr563, 0) | |
| 17: | CWD | vr606=vr558, vr563 | 706 |
| 17: | VSHUFB | vr607=vr542, vr605, vr606 | |
| 17: | VSTQ | r.b(vr558, vr563, 0)=vr607 | 708 |
| 18: | VLQ | vr608=s.c(vr561, vr563, 0) | |
| 18: | A | vr609=vr561, vr563 | |
| 18: | VQBR | vr610=vr608, vr609 | |
| 18: | LR | *vr569=vr610 | SECOND PORTION MODIFIED |
| 18: | LR | *vr543=vr569 | |
| 18: | VLQ | vr611=t.c(vr559, vr563, 0) | |

```
18:    A         vr612=vr559, vr563
18:    VQBR      vr613=vr611, vr612
18:    LR        *vr568=vr613
18:    LR        *vr544=vr568
18:    MPYH      vr579=vr543, vr544
18:    MPYH      vr580=vr544, vr543
18:    MPYU      vr581=vr543, vr544
18:    A         vr582=vr579, vr580
18:    A         vr583=vr581, vr582
18:    LR        *vr545=vr583

18:    VLQ       vr614=r.c (vr557, vr563, 0)     ⎤
18:    CWD       vr615=vr557, vr563              ⎬ 710
18:    VSHUFB    vr616=vr545, vr614, vr615       ⎦

18:    VSTQ      r.c(vr557, vr563, 0)=vr616      — 712

19:    VLQ       vr617=s.d(vr556, vr563, 0)
19:    A         vr618=vr556, vr563
19:    VQBR      vr619=vr617, vr618
19:    LR        *vr567=vr619
19:    LR        *vr546=vr567
19:    VLQ       vr620=t.d(vr555, vr563, 0)
19:    A         vr621=vr555, vr563
19:    VQBR      vr622=vr620, vr621
19:    LR        *vr566=vr622
19:    LR        *vr547=vr566
19:    VLR       vr3=vr546
19:    VLR       vr4=vr547
19:    CALLNR    vr3=$$div_int, vr10",vr2",VR3", VR4", VR5"-VR9", VR0"
19:    VLR       *vr548=vr3

19:    VLQ       vr623=r.d(vr554, vr563, 0)      ⎤
19:    CWD       vr624=vr554, vr563              ⎬ 714
19:    VSHUFB    vr625=vr548, vr623, vr624       ⎦

19:    VSTQ      r.d(vr554, vr563, 0)=vr625      — 716
0:     AI        *vr563=vr563, 16
15:    BCT       ctr=CL.3,
```

THIRD PORTION MODIFIED

FOURTH PORTION MODIFIED

| | | |
|---|---|---|
| 8: | AFS | vr610=vr607, vr609, fcr |
| | ⋮ | |
| 9: | AFS | vr615=vr612, vr614, fcr |
| 9: | CWD | vr649=vr568, vr576 |
| 9: | VSHUFB | vr650=vr615, vr610, vr649 |
| | ⋮ | |
| 10: | AFS | vr620=vr617, vr619, fcr |
| 10: | CWD | vr661=vr567, vr576 |
| 10: | VSHUFB | vr650=vr620, vr650, vr661 |
| | ⋮ | |
| 11: | AFS | vr625=vr622, vr624, fcr |
| 11: | CWD | vr673=vr566, vr576 |
| 11: | VSHUFB | vr650=vr625, vr650, vr673 |
| 11: | VSTQ | x. []0 (vr566, vr576, 0)=vr650 | ~902 |
| 7: | AI | vr562=vr515, 4 |
| 7: | LR | *vr565=vr562 |
| 7: | LR | *vr515=vr565 |
| 0: | AI | *vr576=vr576, 16 |
| 0: | AI | *vr577=vr577, 64 |
| 7: | BCT | ctrl=CL.3 |
| 8: | BB_END | |

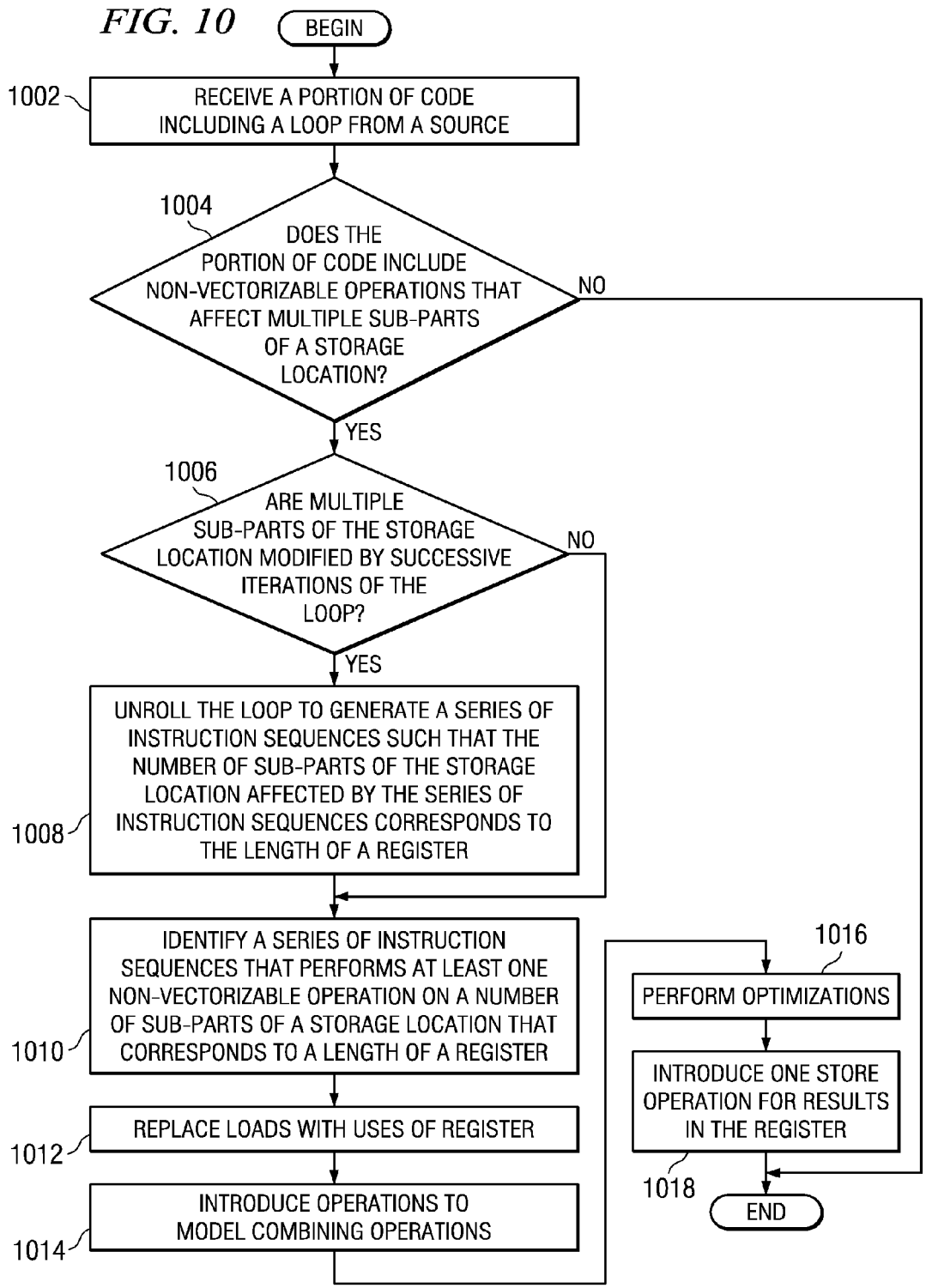

US 8,010,957 B2

COMPILER FOR ELIMINATING REDUNDANT READ-MODIFY-WRITE CODE SEQUENCES IN NON-VECTORIZABLE CODE

BACKGROUND

1. Field of the Invention

The present application relates generally to data processing and, in particular, to compilation of source code to generate executable code. Still more particularly, the present application relates to a compiler method for reducing redundant read-modify-write code sequences in non-vectorizable code.

2. Description of the Related Art

On a machine that supports operations in registers on data that are shorter than the smallest element that can be stored to memory from a register, a sequence of several instructions are used to combine the contents of the memory location to be modified with new, data. These instructions read the old value of the memory location into an internal register of the machine, combine this old data with the mutating sub-datum, and write (or store) the combined result back into the original storage location in memory. These instructions are referred to as a read-modify-write code sequence.

A single instruction stream multiple data stream (SIMD) machine is a computer that performs one operation on multiple sets of data. Performing an operation on multiple sets of data is referred to as "SIMD execution." SIMD execution is typically used to add or multiply two or more sets of numbers at the same time for multimedia encoding and rendering as well as scientific applications. A SIMD machine loads hardware registers with numbers and performs the mathematical operation on all data in a register, or even a set of registers, simultaneously.

When processing array data in loops, it may be possible to vectorize the computations. A compiler may vectorize code to improve performance. Vectorization is a process that packs the operations in several successive iterations into one set of operations, wherein the whole of the register is used and, thus, no read-modify-write sequence is required. All of the bits of the memory location receive new values from the register when a store operation occurs. Similarly, within a single basic block of a program, it may be possible to combine several independent congruent operations on contiguous data into a single SIMD operation. This is called extracting "Superword Level Parallelism" (SLP). This avoids the need for read-modify-write sequences. However, there are many cases in which such operations cannot be vectorized. For example, a dependency relationship may be violated by reordering implicit in vectorization, or several sub-parts of the register may not be computed by congruent operations.

SUMMARY

The exemplary embodiments provide a computer implemented method, apparatus, and computer usable program code for eliminating redundant read-modify-write code sequences in non-vectorizable code. Code is received comprising a sequence of operations. The sequence of operations includes a loop. Non-vectorizable operations are identified within the loop that modifies at least one sub-part of a storage location. The non-vectorizable operations are modified to include a single store operation for the number of sub-parts of the storage location.

BRIEF DESCRIPTION OF THE DRAWINGS

The novel features believed characteristic of the invention are set forth in the appended claims. The illustrative embodiments, however, as well as a preferred mode of use, further objectives and advantages thereof, will best be understood by reference to the following detailed description when read in conjunction with the accompanying drawings, wherein:

FIG. 1 is a block diagram of a data processing system in which aspects of exemplary embodiments may be implemented;

FIG. 3 is a block diagram illustrating an example of instruction processing in a synergistic processor element in accordance with exemplary embodiments;

FIG. 4 illustrates a configuration for compiling and binding a program for a cell processor in accordance with an exemplary embodiment;

FIG. 5 illustrates an example of source code for a synergistic processor element in accordance with an exemplary embodiment;

FIGS. 7A and 7B illustrate an intermediate representation of an exemplary loop in accordance with an exemplary embodiment;

FIG. 9 illustrates the a loop unrolled after combining store operations in accordance with an exemplary embodiment; and FIG. 10 is a flowchart illustrating operation of a compiler for eliminating redundant read-modify-write code sequences in non-vectorizable code in accordance with an exemplary embodiment.

DETAILED DESCRIPTION OF THE ILLUSTRATIVE EMBODIMENTS

Figure 2:
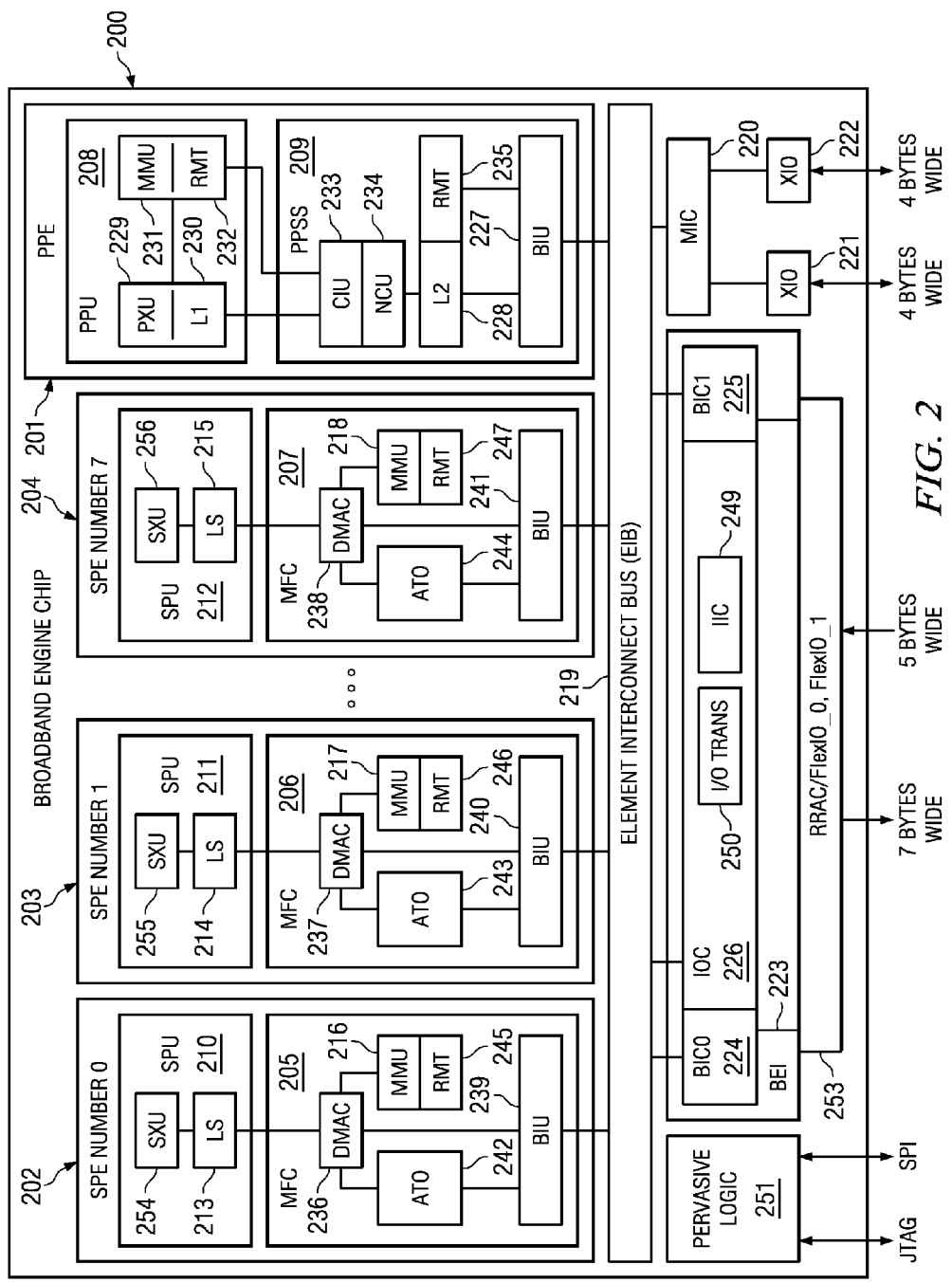
FIG. 2 depicts an exemplary diagram of a Cell Broadband Engine chip in which aspects of illustrative embodiments may be implemented.

FIGS. 1-4 are provided as exemplary diagrams of data processing environments in which aspects of exemplary embodiments may be implemented. It should be appreciated that FIGS. 1-4 are only exemplary and are not intended to assert or imply any limitation with regard to the environments in which different embodiments may be implemented. Many modifications to the depicted environments may be made without departing from the spirit and scope of the illustrative embodiments.

With reference now to the figures, FIG. 1 is a block diagram of a data processing system in which aspects of the exemplary embodiments may be implemented. Data processing system 100 is an example of a computer in which code or instructions implementing the processes of the exemplary embodiments may be located. In the depicted example, data processing system 100 employs a hub architecture including an I/O bridge 104. Processor 106 is connected directly to main memory 108, while processor 106 is connected to I/O bridge 104.

In the depicted example, video adapter 110, local area network (LAN) adapter 112, audio adapter 116, read only memory (ROM) 124, hard disk drive (HDD) 126, DVD-ROM drive 130, universal serial bus (USB) ports and other communications ports 132 may be connected to I/O bridge 104. ROM 124 may be, for example, a flash binary input/output system (BIOS). Hard disk drive 126 and DVD-ROM drive 130 may use, for example, an integrated drive electronics (IDE) or serial advanced technology attachment (SATA) interface.

An operating system or specialized program may run on processor 106 and is used to coordinate and provide control of various components within data processing system 100 in FIG. 1. Instructions for the operating system or specialized program or programs are located on storage devices, such as hard disk drive 126, and may be loaded into main memory 108 for execution by processor 106. The processes of the exemplary embodiments may be performed by processor 106 using computer implemented instructions, which may be located in a memory such as, for example, main memory 108, memory 124, or in one or more peripheral devices 126, 130.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the present invention may be applied to a multiprocessor data processing system.

For example, data processing system 100 may be a general purpose computer, a video game console or other entertainment device, or a server data processing system. The depicted example in FIG. 1 and above-described examples are not meant to imply architectural limitations. For example, data processing system 100 also may be a personal digital assistant (PDA), tablet computer, laptop computer, or telephone device.

FIG. 2 depicts an exemplary diagram of a Cell Broadband Engine (BE) chip in which aspects of the illustrative embodiments may be implemented. Cell BE chip 200 is a single-chip multiprocessor implementation directed toward distributed processing targeted for media-rich applications such as game consoles, desktop systems, and servers.

Cell BE chip 200 may be logically separated into the following functional components: Power PC® processor element (PPE) 201, synergistic processor units (SPUs) 210, 211, and 212, and memory flow controllers (MFCs) 205, 206, and 207. Although synergistic processor elements (SPEs) 202, 203, and 204 and PPE 201 are shown by example, any type of processor element may be supported. Exemplary Cell BE chip 200 implementation includes one PPE 201 and eight SPEs, although FIG. 2 shows only three SPEs 202, 203, and 204. The SPE of a CELL Processor is a first implementation of a new processor architecture designed to accelerate media and data streaming workloads.

Cell BE chip 200 may be a system-on-a-chip such that each of the elements depicted in FIG. 2 may be provided on a single microprocessor chip. Moreover, Cell BE chip 200 is a heterogeneous processing environment in which each of SPUs 210, 211, and 212 may receive different instructions from each of the other SPUs in the system. Moreover, the instruction set for SPUs 210, 211, and 212 is different from that of Power PC® processor unit (PPU) 208, e.g., PPU 208 may execute Reduced Instruction Set Computer (RISC) based instructions in the Power™ architecture while SPUs 210, 211, and 212 execute vectorized instructions.

Each SPE includes one SPU 210, 211, or 212 with its own local store (LS) area 213, 214, or 215 and a dedicated MFC 205, 206, or 207 that has an associated memory management unit (MMU) 216, 217, or 218 to hold and process memory protection and access permission information. Once again, although SPUs are shown by example, any type of processor unit may be supported. Additionally, Cell BE chip 200 implements element interconnect bus (EIB) 219 and other I/O structures to facilitate on-chip and external data flow.

EIB 219 serves as the primary on-chip bus for PPE 201 and SPEs 202, 203, and 204. In addition, EIB 219 interfaces to other on-chip interface controllers that are dedicated to off-chip accesses. The on-chip interface controllers include the memory interface controller (MIC) 220, which provides two extreme data rate I/O (XIO) memory channels 221 and 222, and Cell BE interface unit (BEI) 223, which provides two high-speed external I/O channels and the internal interrupt control for Cell BE 200. BEI 223 is implemented as bus interface controllers (BICs, labeled BIC0 & BIC1) 224 and 225 and I/O interface controller (IOC) 226. The two high-speed external I/O channels connected to a polarity of Redwood Rambus® Asic Cell (RRAC) interfaces providing the flexible input and output (FlexIO_0 & FlexIO_1) 253 for the Cell BE 200.

Each SPU 210, 211, or 212 has a corresponding LS area 213, 214, or 215 and synergistic execution units (SXU) 254, 255, or 256. Each individual SPU 210, 211, or 212 can execute instructions (including data load and store operations) only from within its associated LS area 213, 214, or 215. For this reason, MFC direct memory access (DMA) operations via SPU's 210, 211, and 212 dedicated MFCs 205, 206, and 207 perform all required data transfers to or from storage elsewhere in a system.

A program running on SPU 210, 211, or 212 only references its own LS area 213, 214, or 215 using a LS address. However, each SPU's LS area 213, 214, or 215 is also assigned a real address (RA) within the overall system's memory map. The RA is the address for which a device will respond. In the Power PC®, an application refers to a memory location (or device) by an effective address (EA), which is then mapped into a virtual address (VA) for the memory location (or device) which is then mapped into the RA. The EA is the address used by an application to reference memory and/or a device. This mapping allows an operating system to allocate more memory than is physically in the system (i.e. the term virtual memory referenced by a VA). A memory map is a listing of all the devices (including memory) in the system and their corresponding RA. The memory map is a map of the real address space which identifies the RA for which a device or memory will respond.

This allows privileged software to map a LS area to the EA of a process to facilitate direct memory access transfers between the LS of one SPU and the LS area of another SPU. PPE 201 may also directly access any SPU's LS area using an EA. In the Power PC® there are three states (problem, privileged, and hypervisor). Privileged software is software that is running in either the privileged or hypervisor states. These states have different access privileges. For example, privileged software may have access to the data structures register for mapping real memory into the EA of an application. Problem state is the state the processor is usually in when running an application and usually is prohibited from accessing system management resources (such as the data structures for mapping real memory).

The MFC DMA data commands always include one LS address and one EA. DMA commands copy memory from one location to another. In this case, an MFC DMA command copies data between an EA and a LS address. The LS address directly addresses LS area 213, 214, or 215 of associated SPU 210, 211, or 212 corresponding to the MFC command queues. Command queues are queues of MFC commands. There is one queue to hold commands from the SPU and one queue to hold commands from the PXU or other devices. However, the EA may be arranged or mapped to access any other memory storage area in the system, including LS areas 213, 214, and 215 of the other SPEs 202, 203, and 204.

Main storage (not shown) is shared by PPU 308, PPE 201, SPEs 202, 203, and 204, and I/O devices (not shown) in a system, such as the system shown in FIG. 2. All information held in main memory is visible to all processors and devices in the system. Programs reference main memory using an EA. Since the MFC proxy command queue, control, and status facilities have RAs and the RA is mapped using an EA, it is possible for a power processor element to initiate DMA operations, using an EA between the main storage and local storage of the associated SPEs 202, 203, and 204.

As an example, when a program running on SPU 210, 211, or 212 needs to access main memory, the SPU program generates and places a DMA command, having an appropriate EA and LS address, into its MFC 205, 206, or 207 command queue. After the command is placed into the queue by the SPU program, MFC 205, 206, or 207 executes the command and transfers the required data between the LS area and main memory. MFC 205, 206, or 207 provides a second proxy command queue for commands generated by other devices, such as PPE 201. The MFC proxy command queue is typically used to store a program in local storage prior to starting the SPU. MFC proxy commands can also be used for context store operations.

The EA address provides the MFC with an address which can be translated into a RA by the MMU. The translation process allows for virtualization of system memory and access protection of memory and devices in the real address space. Since LS areas are mapped into the real address space, the EA can also address all the SPU LS areas.

PPE 201 on Cell BE chip 200 consists of 64-bit PPU 208 and Power PC® storage subsystem (PPSS) 209. PPU 208 contains processor execution unit (PXU) 229, level 1 (L1) cache 230, MMU 231 and replacement management table (RMT) 232. PPSS 209 consists of cacheable interface unit (CIU) 233, non-cacheable unit (NCU) 234, level 2 (L2) cache 228, RMT 235 and bus interface unit (BIU) 227. BIU 227 connects PPSS 209 to EIB 219.

SPU 210, 211, or 212 and MFCs 205, 206, and 207 communicate with each other through unidirectional channels that have capacity. Channels are essentially a FIFO which are accessed using one of 34 SPU instructions; read channel (RDCH), write channel (WRCH), and read channel count (RDCHCNT). The RDCHCNT returns the amount of information in the channel. The capacity is the depth of the FIFO. The channels transport data to and from MFCs 205, 206, and 207, SPUs 210, 211, and 212. BIUs 239, 240, and 241 connect MFCs 205, 206, and 207 to EIB 219.

MFCs 205, 206, and 207 provide two main functions for SPUs 210, 211, and 212. MFCs 205, 206, and 207 move data between SPUs 210, 211, or 212, LS area 213, 214, or 215, and main memory. Additionally, MFCs 205, 206, and 207 provide synchronization facilities between SPUs 210, 211, and 212 and other devices in the system.

MFCs 205, 206, and 207 implementation has four functional units: direct memory access controllers (DMACs) 236, 237, and 238, MMUs 216, 217, and 218, atomic units (ATOs) 242, 243, and 244, RMTs 245, 246, and 247, and BIUs 239, 240, and 241. DMACs 236, 237, and 238 maintain and process MFC command queues (MFC CMDQs) (not shown), which consist of a MFC SPU command queue (MFC SPUQ) and a MFC proxy command queue (MFC PrxyQ). The sixteen-entry, MFC SPUQ handles MFC commands received from the SPU channel interface. The eight-entry, MFC PrxyQ processes MFC commands coming from other devices, such as PPE 201 or SPEs 202, 203, and 204, through memory mapped input and output (MMIO) load and store operations. A typical direct memory access command moves data between LS area 213, 214, or 215 and the main memory. The EA parameter of the MFC DMA command is used to address the main storage, including main memory, local storage, and all devices having a RA. The local storage parameter of the MFC DMA command is used to address the associated local storage.

In a virtual mode, MMUs 216, 217, and 218 provide the address translation and memory protection facilities to handle the EA translation request from DMACs 236, 237, and 238 and send back the translated address. Each SPE's MMU maintains a segment lookaside buffer (SLB) and a translation lookaside buffer (TLB). The SLB translates an EA to a VA and the TLB translates the VA coming out of the SLB to a RA. The EA is used by an application and is usually a 32- or 64-bit address. Different application or multiple copies of an application may use the same EA to reference different storage locations (for example, two copies of an application each using the same EA, will need two different physical memory locations.) To accomplish this, the EA is first translated into a much larger VA space which is common for all applications running under the operating system. The EA to VA translation is performed by the SLB. The VA is then translated into a RA using the TLB, which is a cache of the page table or the mapping table containing the VA to RA mappings. This table is maintained by the operating system.

ATOs 242, 243, and 244 provide the level of data caching necessary for maintaining synchronization with other processing units in the system. Atomic direct memory access commands provide the means for the synergist processor elements to perform synchronization with other units.

The main function of BIUs 239, 240, and 241 is to provide SPEs 202, 203, and 204 with an interface to the EIB. EIB 219 provides a communication path between all of the processor cores on Cell BE chip 200 and the external interface controllers attached to EIB 219.

MIC 220 provides an interface between EIB 219 and one or two of XIOs 221 and 222. Extreme data rate (XDR™) dynamic random access memory (DRAM) is a high-speed, highly serial memory provided by Rambus®. A macro provided by Rambus accesses the extreme data rate dynamic random access memory, referred to in this document as XIOs 221 and 222.

MIC 220 is only a slave on EIB 219. MIC 220 acknowledges commands in its configured address range(s), corresponding to the memory in the supported hubs.

BICs 224 and 225 manage data transfer on and off the chip from EIB 219 to either of two external devices. BICs 224 and 225 may exchange non-coherent traffic with an I/O device, or it can extend EIB 219 to another device, which could even be another Cell BE chip. When used to extend EIB 219, the bus protocol maintains coherency between caches in the Cell BE chip 200 and the caches in the attached external device, which could be another Cell BE chip.

IOC 226 handles commands that originate in an I/O interface device and that are destined for the coherent EIB 219. An I/O interface device may be any device that attaches to an I/O interface such as an I/O bridge chip that attaches multiple I/O devices or another Cell BE chip 200 that is accessed in a non-coherent manner. IOC 226 also intercepts accesses on EIB 219 that are destined to memory-mapped registers that reside in or behind an I/O bridge chip or non-coherent Cell BE chip 200, and routes them to the proper I/O interface. IOC 226 also includes internal interrupt controller (IIC) 249 and I/O address translation unit (I/O Trans) 250.

Pervasive logic 251 is a controller that provides the clock management, test features, and power-on sequence for the Cell BE chip 200. Pervasive logic may provide the thermal management system for the processor. Pervasive logic contains a connection to other devices in the system through a Joint Test Action Group (JTAG) or Serial Peripheral Interface (SPI) interface, which are commonly known in the art.

Although specific examples of how the different components may be implemented have been provided, this is not meant to limit the architecture in which the aspects of the illustrative embodiments may be used. The aspects of the illustrative embodiments may be used with any multi-core processor system.

FIG. 3 is a block diagram illustrating an example of instruction processing in a synergistic processor element in accordance with an exemplary embodiments. SPE 300 stores instructions to be executed in local storage 320. Two-way instruction issue 330 issues instructions to odd pipe 340 and even pipe 350. A pipe in a processor is a set of stages used to process an instruction. Each stage in a pipe may perform a different function. For example, a pipe may have a fetch, decode, execute, and write stages.

In these examples, odd pipe 340 performs load operations, store operations, byte operations, and branch operations on data from register file 310. As shown in the example of FIG. 3, register file 310 includes 128 registers that are 128 bits in length. Byte operations include shuffle byte operations and shift/rotate byte operations. Branch operations include an operation to take a branch and a hint branch operation.

Even pipe 350 performs floating point operations, logical operations, arithmetic logic unit (ALU) operations, and byte operations on data from register file 310 in the depicted examples. In the depicted example, floating point operations include four-way floating point (four 32-bit operations on a 128-bit register) and two-way double precision (DP) floating point (two 64-bit operations on a 128-bit register). Logical operations include 128-bit logical operations and select bits operations. ALU operations include 32-bit operations on four data portions of a 128-bit register and 16-bit operations on eight data portions of a 128-bit register. Byte operations for even pipe 350 include shift/rotate operations and sum of absolute difference operations.

As seen above, floating point operations and ALU operations, for example, may perform operations for which only portions of a register are useful or meaningful rather than the entire 128-bit register. Such operations are called "scalar operations." Combining several such scalar operations together so that the operations on the entire register are useful is referred to as "vectorization." In the context of the cell architecture described above, vectorization is referred to as "SIMDization."

Compilers use vectorization to generate code to perform operations on two or more sets of numbers at the same time. For example, SPE 300 may load several registers in register file 310 with numbers. More particularly, SPE 300 may load four 32-bit floating-point numbers into a first register in register file 310 and may load four 32-bit floating-point numbers into a second register. SPE 300 may then perform a mathematical operation on all four 32-bit floating-point numbers in the first register, such as adding a corresponding 32-bit floating-point number in the second register, simultaneously.

When processing array data in loops, it may be possible to vectorize the computations. In programming, a loop is a repetition of instructions within a program. Whenever a process must be repeated, a loop may be set up to handle it. A program may have a main loop and a series of minor loops, which are nested within the main loop. All of the bits of a memory location may legitimately receive new values from the register on the store when computations are vectorized. In the above example, adding a portion of the second register to a corresponding portion of the first register is vectorizable because the addition operation is congruous, meaning the same operation is applied to each portion of the register.

However, cases are present in which such operations cannot be vectorized. The code for these operations is referred to as non-vectorizable code. For example, a dependency relationship may be violated by reordering implicit in vectorization. As a simple example of a dependency relationship, an operation that adds a first portion of a register to a next portion of the register cannot be vectorized because each operation depends on the outcome of the previous operation. Therefore, these operations cannot be performed simultaneously.

Also, several sub-parts of a register being computed by non-congruent operations cannot be vectorized. For instance, an addition operation on a first portion of a register, a subtraction operation on a second portion of the register, a multiplication operation on a third portion of the register, and a division operation on a fourth portion of the register cannot be vectorized, because the operations are not the same across the register.

FIG. 4 illustrates a configuration for compiling and binding a program for a cell BE processor such as cell BE chip 200 in FIG. 2 in accordance with an exemplary embodiment. A cell processor developer partitions the program into PPE and SPE parts. The developer writes the SPE source code 402, 404 to use SPE intrinsics. The developer codes the PPE source code 406, 408 including the necessary commands to load and execute the SPE functions at the appropriate points.

A user sends SPE source code 402 and 404 to SPE compiler 410. In turn, SPE compiler 410 generates SPE objects 412 and 414. SPE linker 430 links SPE objects 412 and 414 together with SPE libraries 416 to form SPE executable 432. SPE embedder 440 converts SPE executable 432 into a form that may be embedded into data 456 of PPE executable 458. SPE embedder 440 generates PPE object 442.

In this example, a user sends PPE source 406 and 408 to SPE compiler 420, which generates PPE objects 422 and 424. PPE linker 450 links PPE objects 422, 424, and 442 together with PPE libraries 444 to create PPE executable 452. This executable includes PPE code 454 and data 456. SPE executable 458 is located within data 456.

FIG. 5 illustrates an example of source code for execution by a synergistic processor element in accordance with an exemplary embodiment. Source code 500 includes two loops, loop 501 and loop 503. In the depicted example, loop 501 is non-SIMDizable because of irregular subscripts in instruction 502. When an instruction uses irregular subscripts, the operation does not simply modify a first value from memory and then a second, adjacent value and then a third, adjacent value. With a 128-bit register, data are loaded 128 bits at a time. These data are loaded from contiguous locations in memory in the illustrative examples. Therefore, with irregular subscripts, one cannot be assured that execution of the loop will result in the first portion of the register being operated on and then the second and then the third and so on. In these examples, the portions are of equal size and each portion contains data from memory.

In addition, loop 503 is non-SIMDizable because of non-congruent computations in instructions 504. A SIMD machine cannot vectorize operations that are not the same. In this case, a SIMD machine cannot perform an addition operation, a subtraction operation, a multiplication operation, and a division operation on subparts of the same register simultaneously.

Figure 6:
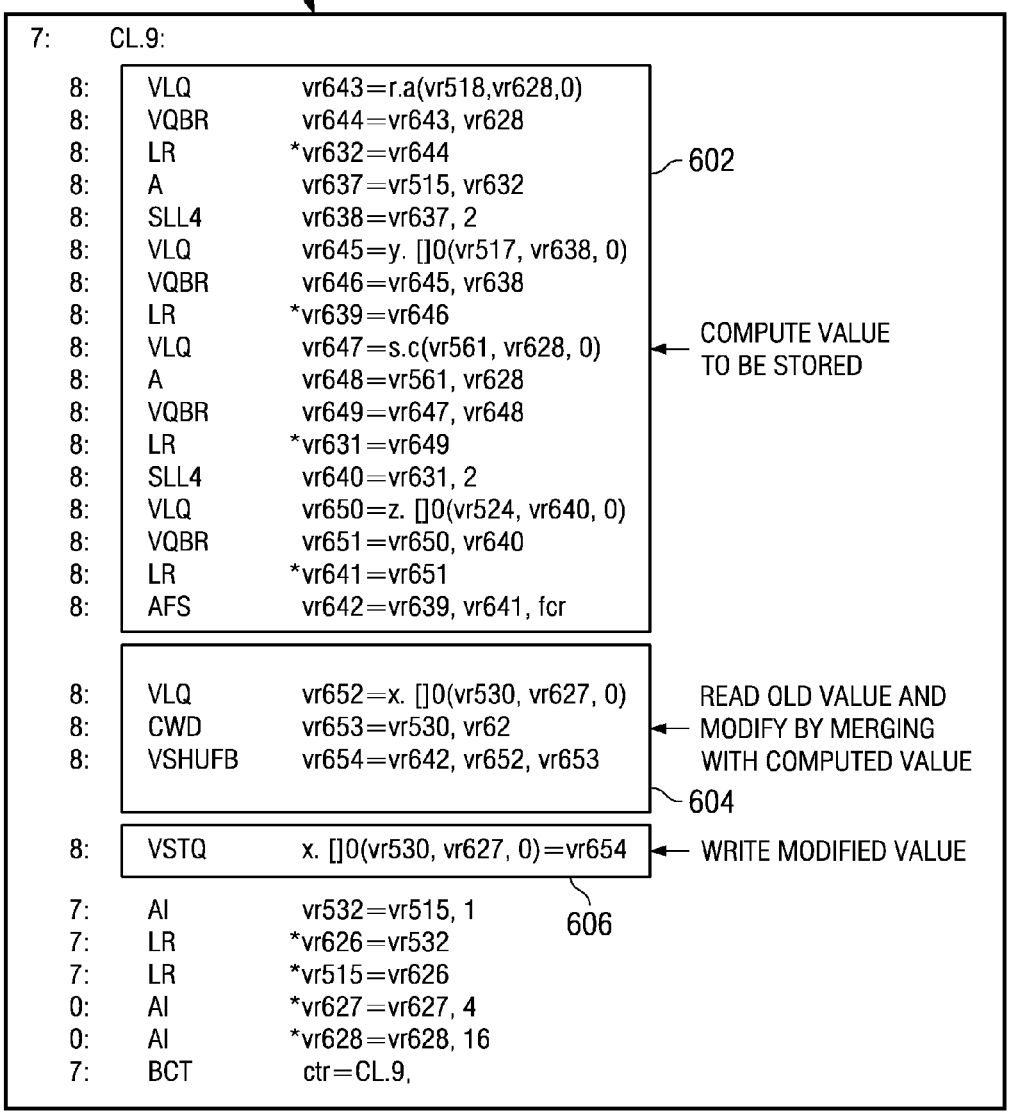
FIG. 6 illustrates an intermediate representation of an exemplary loop in accordance with an exemplary embodiment.

FIG. 6 illustrates an intermediate representation of loop 501 in FIG. 5 in accordance with an exemplary embodiment. Intermediate code 600 includes instructions 602 that compute the value to be stored to memory or other storage, such as a local store of another SPE or PPE. Instructions 604 read the existing value from memory and modify this value by merging the existing value with the computed value as generated by instruction 602. Instruction 606 writes the modified value to memory. Instructions 602 compute a value using a portion of a register. For example, given a 128-bit register, instructions 602 may perform 32-bit operations on a portion of a register. In this example, register r has four 32-bit portions. Intermediate code 600 cannot simply store the contents of the register to memory because all 128 bits of the register will be overwritten whereas only 32 bits of the register are meaningful for a given operation in this example. Therefore, instructions 604 read the existing contents of memory to a second register and combine the computed value with the old contents to form 128 bits of data in which the computed value is updated appropriately. In combining the computed value, this value is merged into the register so that only a portion being of the register being updated is overwritten.

Instruction 606 then stores the 128 bits of data to memory. This store operation results in one 32-bit portion being modified by the operation, while maintaining the integrity of the remaining 96 bits in memory.

Instructions 604 and 606 are referred to as a read-modify-write sequence. Due to the fact that instructions 602 include irregular subscripts, intermediate code 600 is not vectorizable. Therefore, the code must perform the read-modify-write sequence for every iteration of the loop; otherwise, for each 32-bit operation, 96 bits of storage would be overwritten with meaningless data.

FIGS. 7A and 7B illustrate an intermediate representation of the loop 503 in FIG. 5 in accordance with an exemplary embodiment. Intermediate code 700 includes instructions 702 that read 128 bits from memory into a register r and modify the value of a first 32-bit portion in register r by merging with the computed value. Instruction 704 writes the modified value.

Similarly, instructions 706 read 128 bits from memory into register r and modify the value of a second 32-bit portion in register r by merging with the computed value. Instruction 708 writes the modified value.

Turning to FIG. 7B, instructions 710 read 128 bits from memory into r and modify the value of a third 32-bit slot in register r by merging with the computed value. Instruction 712 writes the modified value. Finally, in the depicted example, instructions 714 read 128 bits from memory into register r and modify the value of a fourth 32-bit portion in register r by merging with the computed value. Instruction 716 writes the modified value. Instructions 710, 712, 714, and 716 represent four instances of a read-modify-write sequence.

As illustrated in FIGS. 7A and 7B, the intermediate representation of the loop 503 in FIG. 5 requires four read-modify-write sequences to perform operations on the four portions of the 128 bits of data. In accordance with an exemplary embodiment, a compiler unrolls loops containing non-vectorizable operations where multiple sub-parts of a single memory location are modified by successive iterations. In these examples the storage location may be, for example, a memory. Unrolling a loop reduces the cost of loop overhead by decreasing the number of times the code checks the loop condition. To unroll a loop, the compiler generates two or more of the same sequence of statements for each iteration, and changes incrementing of the counter accordingly. Essentially, loop unrolling increases the number of computations per iteration.

The compiler unrolls the loop by an amount designed to produce a number of subparts that is a multiple of the number of such subparts that fit in a single register. For instance, for a 128-bit register having four 32-bit numbers stored therein and a single instruction in a loop performing an operation on one subpart of the register, the loop would be unrolled a multiple of four times. In loop 503 of FIG. 5, for example, a single iteration causes four 32-bit subparts to be modified. Thus, no unrolling (equivalently unrolling by a factor of 1) is required for a 128-bit register.

Figure 8:
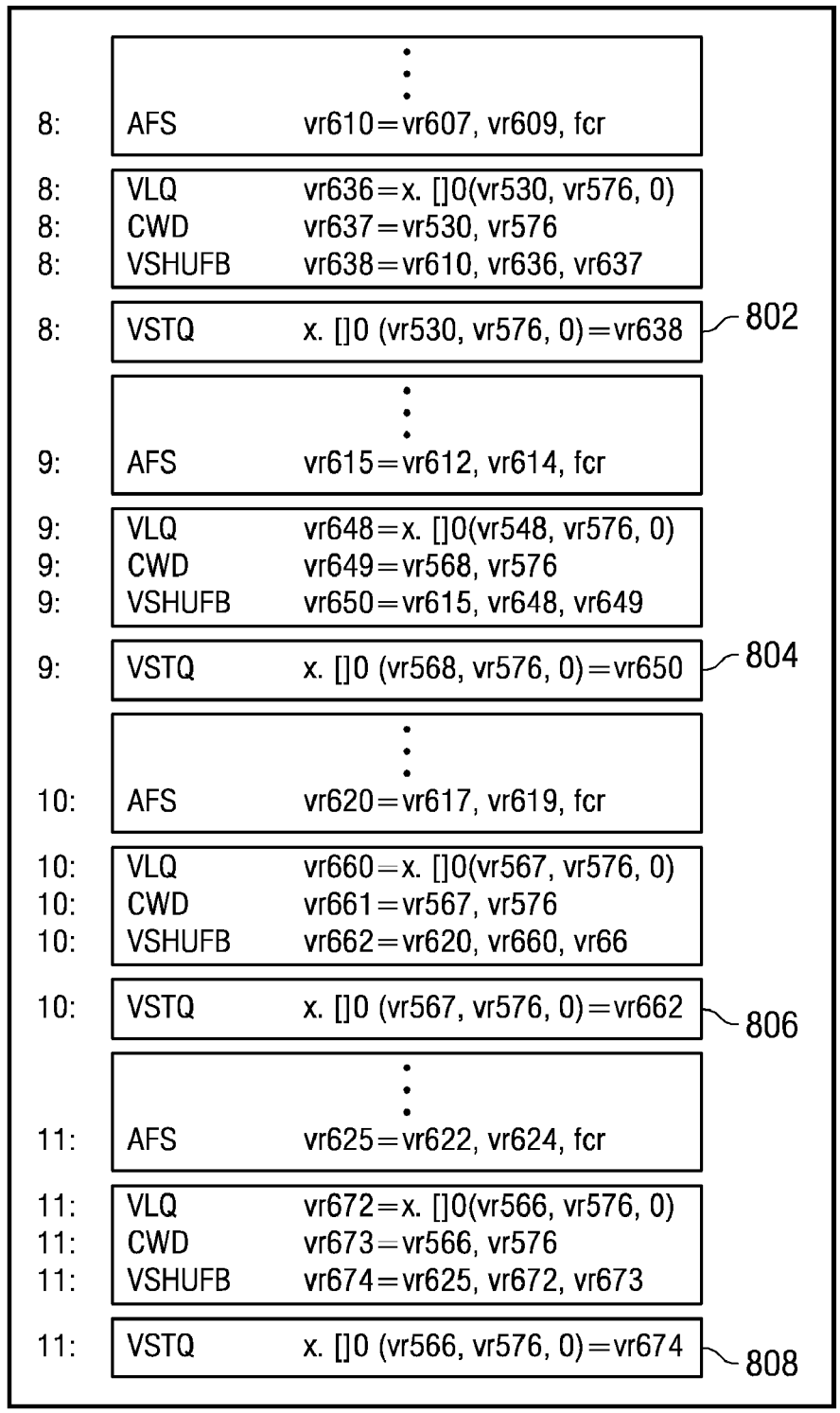
FIG. 8 illustrates a loop unrolled in accordance with an exemplary embodiment.

FIG. 8 illustrates the loop 501 in FIG. 5 unrolled in accordance with an exemplary embodiment. In this instance, unrolling the loop results in four separate store operations 802, 804, 806, and 808. These store operations are the write portion of redundant read-modify-write sequences that result in inefficient operation of the program. Store operations 802, 804, 806, and 808 are to the same 16-byte (128-bit) location in memory.

FIG. 9 illustrates loop 501 in FIG. 5 unrolled after combining store operations in accordance with an exemplary embodiment. The compiler replaces any loads from one of the subject locations referenced by any copy of the loop body produced by such unrolling with uses of the register that will be stored. The compiler introduces explicit operations to model the combining operations, and these operations are subject to optimizations.

Code 900 includes one store operation 902 for the unrolled four iterations of loop 501 of FIG. 5. Thus, the final result is stored only once for each iteration of the unrolled loop, thus eliminating redundant operations.

FIG. 10 is a flowchart illustrating operation of a compiler for eliminating redundant read-modify-write code sequences in non-vectorizable code in accordance with an exemplary embodiment. The steps illustrated in FIG. 10 may be implemented in a program such as a compiler.

It will be understood that each step of the flowchart illustration, and combinations of steps in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart step or steps.

These computer program instructions may also be stored in a computer-readable memory, transmission medium, or storage medium that can direct a processor or other programmable data processing apparatus to function in a particular manner, such that the instructions stored in the computer-readable memory, transmission medium, or storage medium produce an article of manufacture including instruction means which implement the functions specified in the flowchart step or steps.

Accordingly, steps of the flowchart illustration support combinations of means for performing the specified functions, combinations of steps for performing the specified functions and computer usable program code for performing the specified functions. It will also be understood that each step of the flowchart illustration, and combinations of steps in the flowchart illustration, can be implemented by special purpose hardware-based computer systems which perform the specified functions or steps, or by combinations of special purpose hardware and computer instructions. More particularly, the steps of the flowchart illustration may be implemented by the compiler configuration illustrated in FIG. 4, or, more specifically, SPE compiler 410 for example.

With particular reference to FIG. 10, operation begins and the compiler receives a portion of code including a loop from a source (step 1002). The source is, for example, a file containing source code. The compiler determines whether the portion of code includes non-vectorizable operations that affect multiple sub-parts of a storage location (step 1004). In other words, the number of subparts of the storage location is a multiple of the length of the register.

If the portion of code does not include non-vectorizable operations that affect multiple sub-parts of a storage location, then operation ends. If the portion of code does include non-vectorizable code in step 1004, then the compiler determines whether multiple sub-parts of the storage location are modified by successive iterations of the loop (step 1006). If multiple sub-parts of the storage location are modified by successive iterations of the loop, the compiler unrolls the loop to generate a series of instruction sequences such that the number of sub-parts of the storage location affected by the series of instruction sequences corresponds to the length of a register (step 1008).

Next, the compiler identifies a series of instruction sequences that performs at least one non-vectorizable operation on a number of sub-parts of a storage location that corresponds to a length of a register (step 1010). Thereafter, the compiler replaces loads with uses of the register (step 1012) and introduces operations to model combining operations (step 1014). In these examples, loads are load instructions that load the data. In this step, these instructions are eliminated in step 1014 though the use of the register. The description of FIG. 9 provides details of step 1014. In step 1014, instructions such as instructions 706 in FIG. 7 are introduced. Then, the compiler performs optimizations (step 1016). The optimizations include, for example, the removal load instructions as described in the examples above. The compiler then introduces one store operation for results in the register for the unrolled iterations of the loop (step 1018), and operation ends.

Turning back to the determination made in step 1006, if the process determines multiple sub-parts of the storage location are not modified by successive iterations of the loop, the process proceeds to step 1010, as described above.

Thus, the exemplary embodiments solve the deficiencies of the prior art by providing a mechanism in a compiler for eliminating redundant read-modify-write code sequences in non-vectorizable code. By eliminating the redundant read-modify-write code sequences, the program is able to run more efficiently. In addition, the program is able to avoid using a register for the read-modify-write sequence, thus freeing another register for other data manipulation.

The exemplary embodiments can take the form of an entirely hardware embodiment, an entirely software embodiment or an embodiment containing both hardware and software elements. The exemplary embodiments may be implemented in software, which includes but is not limited to firmware, resident software, microcode, etc.

Furthermore, the exemplary embodiments can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the exemplary embodiments has been presented for purposes of illustration and description, and is not intended to be exhaustive or limited to the invention in the form disclosed. Many modifications and variations will be apparent to those of ordinary skill in the art. The embodiments were chosen and described in order to best explain the principles of the invention, the practical application, and to enable others of ordinary skill in the art to understand the invention for various embodiments with various modifications as are suited to the particular use contemplated.

What is claimed is:

1. A computer implemented method for reducing redundant read-modify-write code sequences in non-vectorizable code, the computer implemented method comprising:

receiving, by a compiler, a portion of code wherein the portion of code comprises a loop and includes non-vectorizable operations that affect multiple sub-parts of a storage location, wherein the non-vectorizable operations include operations that use non-alphanumeric irregular subscripts;

determining, by the compiler, that multiple sub-parts of the storage location are modified by successive iterations of the loop;

prior to identifying a series of instruction sequences within the portion of code, unrolling, by the compiler, the loop to generate the series of instruction sequences such that a number of sub-parts of the storage location affected by the series of instruction sequences corresponds to a length of a register, wherein the series of instruction sequences includes one write portion of a redundant read-modify-write code sequence for each iteration of an unrolled loop corresponding to the length of the register so that a final result is stored only once for each iteration of the unrolled loop corresponding to the length of the register;

identifying the series of instruction sequences within the portion of code, wherein the series of instruction sequences performs at least one non-vectorizable operation on a number of sub-parts of the storage location, wherein the number of sub-parts of the storage location corresponds to the length of the register;

replacing, by the compiler, loads in the series of instruction sequences with uses of the register; and introducing, by the compiler, one write portion of the redundant read-modify-write code sequence for the series of instruction sequences.

2. The computer implemented method of claim 1, wherein the number of sub-parts of the storage location corresponds to a multiple of the length of the register.

3. The computer implemented method of claim 1, wherein the one write portion of the redundant read-modify-write code sequence writes a value of the register to the storage location.

4. The computer implemented method of claim 1, further comprising:
introducing, by the compiler, operations to model combining operations within the series of instruction sequences.

5. The computer implemented method of claim 1, wherein the non-vectorizable operations that affect multiple sub-parts of the storage location use multiple different mathematical operations that include addition, subtraction, multiplication, and division.

6. The computer implemented method of claim 1, wherein the computer implemented method is performed by the compiler for a processor element of a heterogeneous processor architecture.

7. An apparatus, which includes a processor, for eliminating redundant read-modify-write code sequences in non-vectorizable code, the apparatus comprising:
a portion of code comprising a loop and non-vectorizable operations that affect multiple sub-parts of a storage location, wherein the non-vectorizable operations include operations that use non-alphanumeric irregular subscripts; and
a compiler that is being executed by the processor, wherein the compiler determines that multiple sub-parts of the storage location are modified by successive iterations of the loop; unrolls, prior to identifying a series of instruction sequences within the portion of code, the loop to generate a series of instruction sequences such that a number of sub-parts of the storage location affected by the series of instruction sequences corresponds to a length of a register, wherein the series of instruction sequences includes one write portion of a redundant read-modify-write code sequence for each iteration of an unrolled loop corresponding to the length of the register so that a final result is stored only once for each iteration of the unrolled loop corresponding to the length of the register; identifies the series of instruction sequences within the portion of code, wherein the series of instruction sequences performs at least one non-vectorizable operation on a number of sub-parts of the storage location, wherein the number of sub-parts of the storage location corresponds to the length of a register; replaces loads in the series of instruction sequences with uses of the register; and, introduces one write portion of the redundant read-modify-write code sequence for the series of instruction sequences.

8. The apparatus of claim 7, wherein the one write portion of the redundant read-modify-write code sequence writes a value of the register to the storage location.

9. The apparatus of claim 7, wherein the compiler comprises a compiler for a processor element of a heterogeneous processor architecture.

10. A computer program product for eliminating redundant read-modify-write code sequences in non-vectorizable code, the computer program product comprising:
a non-transitory computer usable medium having computer usable program code for a compiler embodied therein;
computer usable program code configured to receive a portion of code, wherein the portion of the code comprises a loop and includes non-vectorizable operations that affect multiple sub-parts of a storage location, wherein the non-vectorizable operations include operations that use non-alphanumeric irregular subscripts;
computer usable program code configured to determine that multiple sub-parts of the storage location are modified by successive iterations of the loop;
computer usable program code configured to unroll, prior to identifying a series of instruction sequences within the portion of code, the loop to generate the series of instruction sequences such that a number of sub-parts of the storage location affected by the series of instruction sequences corresponds to a length of a register, wherein the series of instruction sequences includes one write portion of a redundant read-modify-write code sequence for each iteration of an unrolled loop corresponding to the length of the register so that a final result is stored only once for each iteration of the unrolled loop corresponding to the length of the register;
computer usable program code configured to identify the series of instruction sequences within the portion of code, wherein the series of instruction sequences performs at least one non-vectorizable operation on the number of sub-parts of the storage location, wherein the number of sub-parts of the storage location corresponds to the length of a register;
computer usable program code configured to replace loads in the series of instruction sequences with uses of the register; and
computer usable program code configured to introduce one write portion of the redundant read-modify-write code sequence for the series of instruction sequences.

11. The computer program product of claim 10, wherein the one write portion of the redundant read-modify-write code sequence writes a value of the register to the storage location.

12. The computer program product of claim 10, further comprising:
computer usable program code configured to introduce operations to model combining operations within the series of instruction sequences.

13. The computer program product of claim 10, wherein the non-vectorizable operations that affect multiple sub-parts of the storage location use multiple different mathematical operations that include addition, subtraction, multiplication, and division.

14. The computer program product of claim 10, wherein computer useable program code further comprises a compiler program for a processor element of a heterogeneous processor architecture.

* * * * *